Dec. 28, 1965    H. L. RILEY ETAL    3,226,338
VANADIUM PENTOXIDE POTASSIUM PYROSULFATE CATALYST AND
METHOD OF PREPARATION THEREOF
Filed Jan. 3, 1961    2 Sheets-Sheet 1

Inventors
HARRY LISTER Riley
ANdRzej RomANski

By
Bailey, Stephens & Huettig
Attorneys

Inventors
Harry Lister Riley
Andrzej Romanski

United States Patent Office 3,226,338
Patented Dec. 28, 1965

3,226,338
VANADIUM PENTOXIDE POTASSIUM PYROSULFATE CATALYST AND METHOD OF PREPARATION THEREOF
Harry Lister Riley, Worksop, and Andrzej Romanski, Sheffield, England, assignors to United Coke and Chemicals Company Ltd.
Filed Jan. 3, 1961, Ser. No. 79,971
Claims priority, application Great Britain July 3, 1959, 22,973/59
8 Claims. (Cl. 252—440)

This application is a continuation-in-part of our co-pending application Ser. No. 38,858, filed June 27, 1960, for Manufacture of Catalysts, now abandoned.

Many catalytic reactions in the vapour phase can advantageously be carried on with the catalyst in the form of particles fluidised by the reacting gases or vapours. Catalysts containing vanadium and potassium sulphate are used in this form in, for example, the oxidation of naphthalene to phthalic anhydride.

In the manufacture of catalysts containing vanadium and potassium sulphate hitherto, silica gel, made by a complicated process which involves the addition of sulphuric acid to potassium silicate solution, is formed into a slurry with a soluble vanadium compound, and the slurry is dried and heated to form the catalyst. Apart from the lengthy, costly and troublesome character of this method of manufacture, the resultant catalysts have the serious disadvantage that they are exceedingly friable and rapidly break down when used in a fluidised-bed reactor and therefore tend not to fluidise uniformly. In addition, a quantity of catalyst dust is formed in the space above the bed and this causes the temperature above the bed to rise. Filters are normally provided in order to prevent catalyst particles from escaping, and as the temperature above the bed rises there is an increasing tendency for hot spots to form on the filters and damage them.

Our object is to produce improved catalyst particles, and we do this, according to the invention, by causing porous solid particles to absorb at least one material which is catalytic or becomes catalytic on decomposition or other change in the course of or after the absorption. For simplicity of description all such materials will be called "catalytic materials" herein. The process of absorption of the catalytic material by the solid particles is carried out at a temperature at which the catalytic material melts. In carrying out our invention we form a fluidised bed of the porous particles and particles of the catalytic material and we maintain the bed fluidised at the required temperature until the catalytic material is taken up by the porous particles.

The invention can be applied to the manufacture of catalysts for use in various different reactions. The necessary characteristic of the catalytic material is that it must be capable of being introduced in the form of solid particles into the fluidised bed of porous particles, and the solid particles of catalytic material must melt at the temperature of the bed and wet the porous particles so that the resultant liquid spreads out over and is absorbed or adsorbed by the porous particles, which are in effect carriers of the catalytic material.

It is important that the catalytic material should be wholly taken up by the carrier particles. The catalytic material should not form a continuous thick layer on the outer surface because the mass of particles might then bind together when used as a catalyst. It is necessary, of course, to choose the porous carrier particles with proper regard to both the catalytic material and the reaction in which the catalyst is to be used.

The carrier particles may most conveniently be silica gel, but may be, for instance, activated alumina, pumice, zeolites, clays or metallic oxides, provided that they are porous and stable at the fluidising temperature. However, not every silica gel is suitable as a carrier in every catalytic reaction. An empirical test is to mix the silica gel or other carrier particles with the catalytic material in the desired proportions and heat the mixture in a muffle furnace at a temperature above the melting point of the catalytic material with intermittent stirring. After a few hours, suitable carrier particles will give a dry mobile powder, whereas unsuitable carrier particles will become a sticky agglomerated mass.

The degree of porosity of the carrier particles may vary considerably. In any case the carrier particles must not sinter together at the temperatures at which the catalyst is to be used.

We find that the smaller the size of the individual particles of the carrier, the greater the proportional amount of the catalytic material they will take up. The smaller particles become completely impregnated first, i.e. in a given time the amount of the catalyitc material taken up is inversely proportional to the radius of the particle. This result is advantageous when the catalyst is fluidised in reacting gases because the smaller particles become heavier and therefore less liable to be blown out of the fluidised bed. Typical particle-size grading for silica gel are 50 to 200 B.S. (British standard) sieves.

The means by which the objects of the invention are obtained are described more fully with reference to the accompanying drawings, in which:

FIGURE 2 is a diagrammatic view of an apparatus for carrying out the process of this invention.

Figure 1:
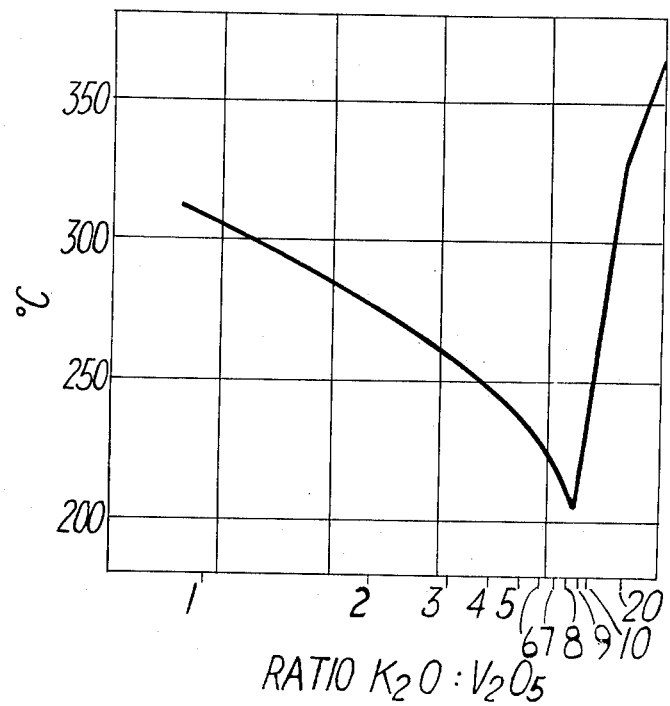
FIGURE 1 is a graph of the softening point of one form of catalytic material.

The invention is particularly applicable to catalysts containing vanadium and potassium sulphate for use in the manufacture of phthalic anhydride. A mixture of vanadium pentoxide and potassium pyrosulphate when fused yields a glass which can be ground to fine particles and which has no sharp melting point. The softening-point of such a mixture depends on the molar ratio of the potassium pyrosulphate to the vanadium pentoxide. This is illustrated by FIGURE 1 of the accompanying drawings, which is a graph of the molar ratio as $K_2O:V_2O_5$ plotted as abscissae against the softening point of the resultant glass (measured by the ball and ring method) plotted as ordinates. As may be seen from the graph the softening point is at a minimum when the molar ratio is about 8.5. The molar ratio in the catalyst is of importance in determining its reactivity, and is preferably within the range 1.0 to 6.0. Within this range the softening point is below 320° C., so if the temperature in the fluidised bed is from 350 to 400° C. the glass will readily spread as a liquid over the surfaces of the carrier particles. The final activation of the catalyst should be carried out at a temperature of 400 to 420° C.

Figure 2:
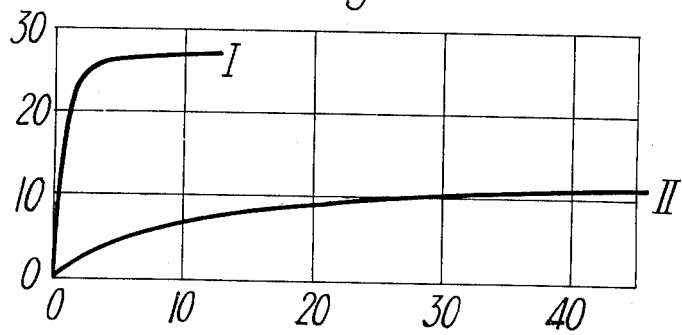
FIGURE 2 is a graph of the heat of wetting of two different silica gels.

The heat of wetting and the pore size may also be used to determine the suitability of porous particles used as carriers in catalyst for use in the production of phthalic anhydride. For instance two silica gels commercially available give the curves shown in FIGURE 2 of the accompanying drawings. When wetted with tributyl citrate, the heat of wetting in calories per gram is plotted as ordinates against the time in minutes plotted as abscissae. The curve marked I shows a high heat of wetting for the first silica gel indicating that it has a large internal surface area. The curve marked II shows a low heat of wetting extending over a long period and indicates that the second silica gel II has a smaller pore diameter with a larger internal surface area than the first. Both these gels have high internal specific surfaces as measured by nitrogen absorption (500 sq.m./g. for the first gel and 710 sq.m./g. for the second), but the pore diameter of the first gel (53 A.) is much larger than that of the second (14 A.). The first gel is suitable for use in a catalyst to be used in the production of phthalic anhydride, but the second is not. Broadly it may be said that for this purpose a high heat of wetting and a pore size of at least 40 A. are required.

The ratio of catalytic material to carrier particles can vary widely. For example with silica gel and the glass of vanadium and potassium sulphate, the glass may be from 1 to 35% by weight of the catalyst. Very satisfactory results are obtained with 25% by weight of a glass of molar ratio $K_2O:V_2O_5$ of 4:1. This gives a lower concentration of $V_2O_5$ in the final catalyst, about 4%, than the 9 to 10% in the catalysts made by the method usual hitherto. As the catalyst is as effective as the prior catalysts there is thus a saving of vanadium. In addition the novel catalyst does not break down so readily.

Figure 3:
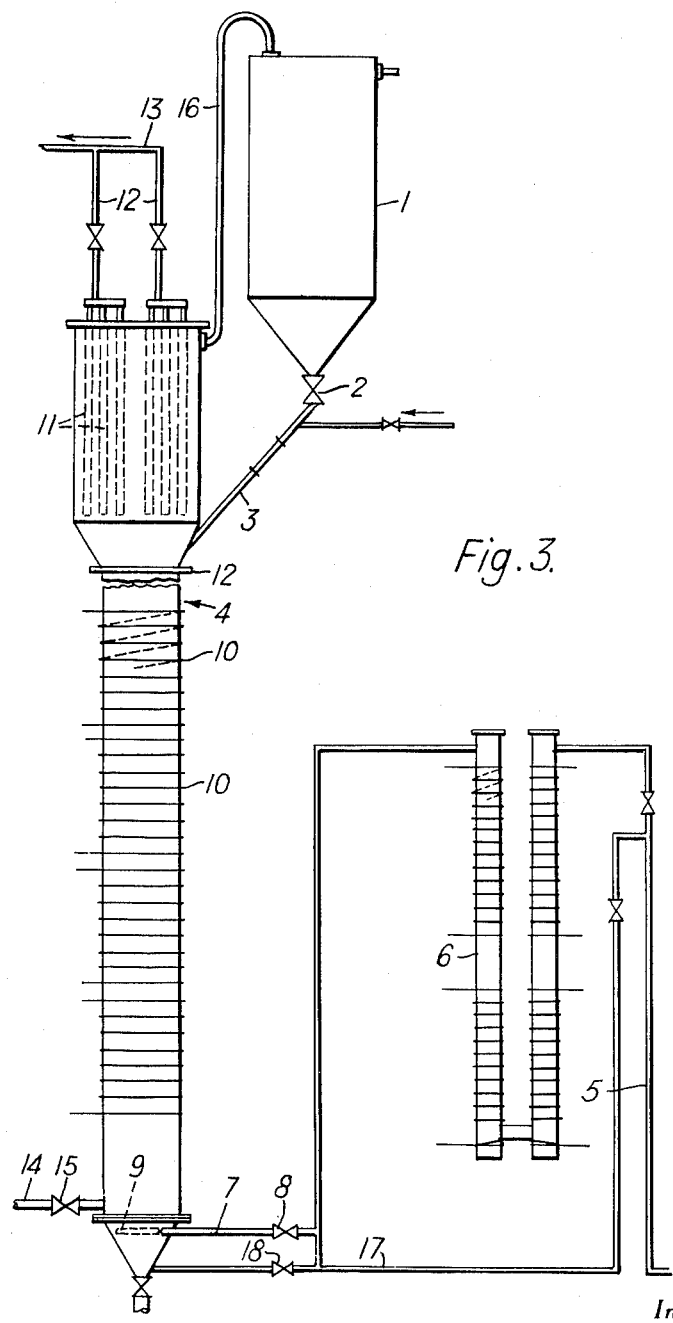

One process according to the invention will now be described with reference to FIGURE 3 of the accompanying drawings, which shows diagramamtically a plant in which the process may be carried out.

The process described is for the manufacture of a catalyst for use in the production of phthalic anhydride. First a mixture of vanadium pentoxide and potassium pyrosulphate is melted, cast, ground to about 100 B.S. sieve mesh, weighed and mixed in a tumbling mill with some silica gel particles of 40 to 60 A. pore size and of particle size between 50 and 200 B.S. sieve mesh.

The mixture is charged into a closed hopper 1 from which it can pass under the control of a valve 2 down a pipe 3 into a fluidising column 4. Compressed air supplied through a pipe 5 flows through a preheater 6, which is externally heated electrically, and a pipe 7 to the base of the column 4 under the control of a valve 8 and emerges through a distributing ring 9. This air flows upwards through the column to maintain the particles fluidised in the column. The temperature in the column is maintained between 350 and 400° C. by external heating elements 10. At the top of the column there are filters 11, through which the air passes to flow to a chimney through pipes 12 and 13.

At the base of the column there is an outlet 14 controlled by a valve 15, which is opened when the production of the catalyst is complete while the flow of air is maintained so that the catalyst is discharged in fluidised form, to be collected in drums.

For ease of delivery of the material from the hopper 1 to the column 4 the particles in the hopper are occasionally fluidised. The air stream used to do this may be bled off from the main air stream which flows up the column. This air leaves the hopper through a pipe 16 and passes to the filters 11, thus avoiding the provision of separate filters on the hopper.

It is possible for the main air flow from the pipe 5 to by-pass the heater 6 through a pipe 17 controlled by a valve 18, so that cold air may be blow through the column 4 when it is empty to clear it of dust.

As an example, one column 4 was 23 feet high and 14 inches in diameter, and in it 480 lbs. of silica gel were fluidised by air at from 350 to 400° C., the air velocity being ½ ft. per second in the empty column. 160 lbs. of the powdered vanadium pentoxide potassium pyrosulphate glass mixed with 108 lbs. of silica gel were added over a period of 3 hours. The fluidisation was maintained for a total of 8 hours, during the final 2 hours of which the temperature was increased to about 420° C. to activate the catalyst.

The pore structure of silica gel tends to shrink and collapse at about 600° C. so the temperature in the column must be well below this figure and advantageously below 500° C. when the carrier particles are of silica gel.

The fluidised-bed technique employed in the apparatus illustrated is extremely advantageous, being simple, leading to very rapid and perfect mixing, enabling the temperature to be closely and exactly controlled and involving plant of low capital cost having a high rate of production.

Various other catalytic materials having melting points below 500° C. may be used with silica gel as the carrier particles, and examples are given in the table below. As indicated in the table and in more detail in some of the examples some of these materials undergo some chemical change in the process and only in so doing acquire catalytic properties.

TABLE I

| Compound | M.P. in °C. | Comment |
| --- | --- | --- |
| $Ba(OH)_2.8H_2O$ | 77.9 | Melts in water of crystallisation. |
| $Ce(NO_3)_3.6H_2O$ | 100.0 | Do. |
| $CrO_3$ | 196.0 | Decomposes to $Cr_2O_3$ at M.P. |
| $Co(NO_3)_2.6H_2O$ | 100.0 | Melts in water of crystallisation with decomposition to oxide at higher temperatures. |
| $Cu(NO_3)_2.3H_2O$ | 114.5 | Melts in water of crystallisation with decomposition to oxide at higher temperatures. |
| $Cu_2Cl_2$ | 422.0 | |
| $FeCl_3$ | 315.0 | |
| $Mn(NO_3)_2.6H_2O$ | 25.8 | Melts in water of crystallisation |
| $Ni(NO_3)_2.6H_2O$ | 56.7 | Do. |
| $H_4P_2O_7$ | 61.0 | |
| $H_2PtCl_6.6H_2O$ | 60 | Melts in water of crystallisation an decomposes. |
| $K_2Cr_2O_7$ | 398.0 | |
| $KH_2PO_4$ | 96.0 | |
| $KHSO_4$ | 210.0 | |
| $K_2S_2O_7$ | 300.0 | |
| Se | 50.0 | |
| AgCl | 455.0 | |
| $AgNO_3$ | 212.0 | Decomposes at higher temperatures to metallic silver. |
| $SnCl_2$ | 246.8 | |
| $UO_2(NO_3)_2.6H_2O$ | 60.2 | Melts in water of crystallisation and decomposes to oxide at higher temperatures. |
| $ZnCl_2$ | 365 | |

The following are examples of the absorption of some of these materials by silica gel.

*Example 1*

This illustrates the production of potassium dichromate catalysts, which are useful in aromatisation reactions. A mixture of 150 parts by weight of $K_2Cr_2O_7$ and 150 parts by weight of wide-pored silica gel (i.e. with pores of about 45 A. size) was slowly run into a column heated to 430° C. containing 200 parts by weight of the same gel fluidised by air. In the course of 3 hours the potassium dichromate was absorbed by the silica gel.

*Example 2*

This illustrates the production of chromium catalysts, which are useful in cyclisation and aromatisation reactions. A mixture of 150 parts by weight of $CrO_3$ and 150 parts by weight of wide-pored silica gel was slowly run into a column heated to 200° C. containing 200 parts by weight of the same gel fluidised by air. In the course of three hours the chromic oxide was absorbed by the gel. On increasing the temperature to 300° C. the CrO₃ was converted to Cr₂O₃.

Example 3

This illustrates the production of cuprous chloride catalysts which are useful in oxidation and polymerisation reactions. A mixture of 80 parts by weight of wide-pored silica gel and 20 parts by weight of $Cu_2Cl_2$ was slowly run into a column heated to 435° C. containing 100 parts by weight of the same gel fluidised by air. The cuprous chloride was absorbed by the gel in about 3 hours.

Example 4

This illustrates the production of nickel catalysts, which are useful in hydrogenation reactions. It is also an example of a gel impregnated with a material which is not initially catalytic but which melts and decomposes to acquire catalytic properties. A column containing 132 parts by weight of wide-pored silica gel fluidised by air was heated to 60° C. 87 parts by weight of nickel nitrate $Ni(NO_3)_2.6H_2O$ mixed with 200 parts by weight of silica gel were added slowly to the column. The colour of the gel became a uniform green. The addition was completed in 30 minutes. The temperature was slowly raised to 350° C. over about 3 hours. The colour of the bed changed to pale green. At 150° C. oxides of nitrogen were evolved and the impregnated gel became progressively darker until the product, i.e. silica gel with absorbed nickel oxide, was black. As is well known, meallic nickel catalysts for use in hydrogenation reactions are commonly made in the oxide form and are reduced to metallic nickel in the reactor by a preliminary treatment with a reducing gas such as hydrogen. To yield an active hydrogenation catalyst the black product made as described is treated in this way.

Example 5

This illustrates the production of a cobalt catalyst which is suitable for use in hydrogenation and desulphurisation processes. 125 parts by weight of wide-pored silica gel graded between 0.1 and 0.3 mm. sieves were introduced into a column at 90° C. and fluidised with air. A mixture of 123.7 parts by weight of finely powdered cobalt nitrate $Co(NO_3)_2.6H_2O$ mixed with 100 parts by weight of the same silica gel was slowly added to the column. The temperature was then raised gradually to 180° C. and held there until the nitrate had decomposed. At the lower temperature the cobalt nitrate hydrate melted and the resulting liquid was immediately absorbed in the silica gel. As the temperature increased, first water and then oxides of nitrogen were driven off, leaving the gel coated with some 13.6% of cobalt oxide $Co_2O_3$. The operation was completed in 2½ hours.

Example 6

This illustrates the prduction of a silver catalyst which is useful in the oxidation of ethylene to ethylene oxide, and is an example of the use of a material which decomposes to produce the final catalyst. 185 parts by weight of wide-pored silica gel graded between 0.1 and 0.3 mm. sieves were introduced into a column at 220° C. and fluidised with air. 23.6 parts by weight of finely crushed silver nitrate mixed with 100 parts by weight of the same silica gel were slowly added. When the addition was complete the temperature of the fluidised bed was raised to 460° C. The silver nitrate decomposed leaving the silica gel coated with metallic silver (5%). The operation lasted about 3 hours.

Normally only one catalyst material is deposited on the porous particles, but if a mixture of catalysts is required it is simple to cause the porous carrier particles to take up two different catalytic materials. For instance cobalt nitrate hexahydrate and nickel nitrate hexahydrate may be taken up together.

As indicated above, the porous carrier particles may be of other materials, and some examples of the use of these will now be given.

Example 7

200 parts by weight of active charcoal, crushed and graded between 0.7 and 0.07 mm. (25–200 B.S. sieve), were fluidised by nitrogen in a column at 60° C. 35.7 parts by weight finely divided stannous chloride

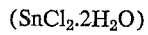

$$(SnCl_2.2H_2O)$$

mixed with 70 parts by weight of the same active charcoal were slowly added. The temperature was then gradually increased to 260° C. The whole operation lasted about 3 hours. The catalyst consisted of 90% carbon coated with 10% $SnCl_2$. Such a catalyst is useful in organic condensation reactions.

Example 8

275 parts by weight of pumice crushed to pass a 100 B.S. mesh sieve (0.152 mm.) were fluidised with air in a column at 390° C. A mixture of 200 parts by weight of the same crushed pumice and 25 parts by weight of the powdered melt of vanadium pentoxide of potassium pyrosulphate described above was slowly introduced into the column over a period of 3 hours. The resulting catalyst contained 5% of melt.

We claim:
1. A method in which a catalyst suitable for use in the production of phthalic anhydride is produced comprising introducing solid particles of a glass of vanadium pentoxide and potassium pyrosulphate having a molar ratio of $K_2O:V_2O_5$ between 1.0 and 6.0 into a fluidised bed of particles of silica gel having a pore size of from 40 to about 60 A., said bed having a temperature between 350 and 400° C., said glass amounting to from 1 to 35% by weight of the total mass of particles, and said bed being maintained fluidised until the glass melts and is taken up by the silica gel.

2. A method according to claim 1 in which the particle size of the silica gel is between 50 and 200 B.S. sieves.

3. A method according to claim 1 in which the catalyst, while fluidised, is activated at a temperature between 400 and 420° C.

4. A method of preparing a catalyst adapted for the conversion of naphthalene to phthalic anhydride comprising intimately mixing solid glass particles of a fused mixture of vanadium pentoxide and potassium pyrosulfate in the molar ratio of $K_2O:V_2O_5$ between 1.0 and 6.0, said glass particles having a softening temperature below 320° C., with silica gel particles having a pore size of from 40 to about 60 A., and a maximum particle sieve size of about 50 B.S., said glass particles amounting to from about 1 to 35 percent by weight of the total mass of particles, and heating and agitating the mixture of discrete glass and silica gel particles at a temperature between 350 and 400° C. for a time such that the glass particles melt and are entirely taken up by the silica gel particles.

5. A method as in claim 4, further comprising additionally heating the mixture of glass and silica gel particles at a temperature of from about 400 to 420° C. to activate the catalyst.

6. The product obtained by the process of claim 5.

7. A composition for the production of a catalyst adapted for use in converting naphthalene to phthalic anhydride comprising a solidified fused glass mixture of vanadium pentoxide and potassium pyrosulphate in the molar ratio of $K_2O:V_2O_5$ between 1.0 and 6.0, and having a softening temperature below 320° C. and liquid at a temperature from about 350 to 400° C.

8. A composition as in claim 7 wherein said molar ratio is about 4.0.

(References on following page)

References Cited by the Examiner

UNITED STATES PATENTS

| | | | |
|---|---|---|---|
| 1,930,716 | 10/1933 | Jaeger | 260—346.4 |
| 2,459,896 | 1/1949 | Schwarz | 252—454 X |
| 2,489,347 | 11/1949 | Rollman | 260—346.6 |
| 2,625,554 | 1/1953 | Darby | 252—456 |
| 2,716,665 | 8/1955 | Hadley et al. | 252—454 X |
| 2,846,488 | 8/1958 | Miller | 252—472 X |
| 2,861,983 | 11/1958 | Fotis | 252—454 X |
| 2,952,719 | 9/1960 | Appell | 252—454 X |
| 2,973,371 | 2/1961 | Chomitz et al. | 252—456 X |
| 2,977,324 | 3/1961 | Dowden et al. | 252—456 X |
| 3,038,911 | 6/1962 | Berets et al. | 252—456 X |

MAURICE A. BRINDISI, *Primary Examiner.*

BENJAMIN HENKIN, *Examiner.*